United States Patent [19]

Newton

[11] Patent Number: 4,933,089
[45] Date of Patent: Jun. 12, 1990

[54] APPARATUS AND PROCESS FOR PARAFFIN ABATEMENT

[76] Inventor: George D. Newton, #6 Blalock Woods, Houston, Tex. 77024

[21] Appl. No.: 156,247

[22] Filed: Feb. 16, 1988

Related U.S. Application Data

[63] Continuation-in-part of Ser. No. 77,414, Jul. 24, 1987, Pat. No. 4,770,792.

[51] Int. Cl.$^5$ .............................................. B01D 17/04
[52] U.S. Cl. ...................................... 210/696; 166/304; 210/170; 210/205; 210/251
[58] Field of Search ................. 210/194, 197, 199, 498, 210/708, 799, DIG. 5, 205, 251, 696; 252/358; 166/105.4, 304, 902; 204/49, 112, 196, 197, 248

[56] References Cited

U.S. PATENT DOCUMENTS

| | | | |
|---|---|---|---|
| 194,704 | 8/1877 | Means . | |
| 1,503,004 | 7/1924 | Parker | 138/40 X |
| 1,592,079 | 7/1926 | Chancellor et al. . | |
| 1,662,296 | 3/1928 | Carlson . | |
| 1,780,130 | 10/1930 | Heard . | |
| 2,143,836 | 1/1939 | Anderson . | |
| 2,155,435 | 4/1939 | McCoy | 210/696 |
| 2,358,981 | 9/1944 | Lattner | 204/197 |
| 2,401,546 | 6/1946 | Brown | 204/197 |
| 2,560,416 | 7/1951 | Courtney . | |
| 3,448,034 | 6/1969 | Craft et al. | 204/197 |
| 3,486,999 | 12/1969 | Craft | 204/197 |
| 3,491,882 | 1/1970 | Elam | 210/799 |
| 3,835,015 | 9/1974 | Gary | 204/197 |
| 3,841,568 | 10/1974 | Broad | 239/590 |
| 3,891,394 | 6/1975 | Smith et al. | 204/197 X |
| 3,914,348 | 10/1975 | Kors et al. | 239/555 X |
| 3,919,068 | 11/1975 | Gary | 204/197 |
| 3,954,124 | 5/1976 | Self | 138/40 X |
| 3,974,071 | 8/1976 | Dunn et al. | 210/696 |
| 4,011,906 | 3/1977 | Alexander et al. | 166/105 |
| 4,057,493 | 11/1977 | Davies et al. | 210/799 |
| 4,138,931 | 2/1979 | Hermann et al. | 92/87 |
| 4,202,751 | 5/1980 | Fukuzuka et al. | 204/197 |
| 4,238,326 | 12/1980 | Wolf | 210/708 X |
| 4,240,908 | 12/1980 | Swain et al. | 210/708 X |
| 4,310,602 | 1/1982 | Martin, Jr. | 210/498 X |
| 4,402,485 | 9/1983 | Fagerlund | 138/41 X |
| 4,479,875 | 10/1984 | Nelson | 210/DIG. 5 |
| 4,606,828 | 8/1986 | Wells | 210/696 |
| 4,647,443 | 3/1987 | Apffel | 423/449 |
| 4,713,159 | 12/1987 | Truitt et al. | 204/197 |

FOREIGN PATENT DOCUMENTS

| 2410421 | 9/1974 | Fed. Rep. of Germany | 210/708 |
|---|---|---|---|
| 124559 | 9/1979 | Japan | 210/708 |

*Primary Examiner*—Robert Spitzer
*Attorney, Agent, or Firm*—David M. Ostfeld

[57] ABSTRACT

An apparatus and process for preventing the accumulation of paraffin deposits is disclosed. The invention is practiced by conveying the production fluids into contact with a metal which has a nickel content greater than seventy-five percent. In one embodiment of the invention, a gas anchor tool is disclosed which prevents the accumulation of paraffin solids.

11 Claims, 1 Drawing Sheet

APPARATUS AND PROCESS FOR PARAFFIN ABATEMENT

This is a continuation-in-part of U.S. patent application No. 077,414, filed July 24, 1987, Pat. No. 4,770,792.

FIELD OF THE INVENTION

The present invention relates to an apparatus and process for paraffin abatement. More particularly, the invention relates to an apparatus and process for preventing the accumulation of paraffin deposits in equipment used to produce oil and gas.

BACKGROUND OF THE INVENTION

Hydrocarbons, such as crude oil produced from underground reservoirs, often contain many compounds which are entrained within the crude oil. For example, an oil well will frequently produce large quantities of water, gas, carbon dioxide, solids and crude oil. To facilitate the pumping of the oil from an underground reservoir, devices such as gas anchors are commonly used to prevent large quantities of gas from being produced with the oil. If gas is produced with the oil, gas locks can prevent the efficient operation of the pumping mechanism. In addition, gas anchors and other devices can be used to prevent solids in the production fluids from being drawn into the pumping mechanism.

In the production of fluids from an underground reservoir, paraffin compounds associated with the hydrocarbons may solidify and coat the surfaces of downhole equipment. The solidification of paraffins may be due to a lower temperature which causes the crystallization of the paraffin, or may be due to the reaction of paraffin compounds with water and other fluids produced from the reservoir. In any event, the accumulation of paraffin solids on production equipment can impair the operation of the equipment.

Different techniques have been developed to remove the accumulation of paraffin solids from downhole equipment. For example, U.S. Pat. No. 4,011,906 to Alexander, et al. discloses a device which uses hot water to remove paraffin deposits from production tubing. In U.S. Pat. No. 4,138,931 to Hermann, et al., a hydraulic pump inhibits the formation of deposits by using plungers to create a fluid flow which produces a scrubbing effect on the cavity surface. In U.S. Pat. No. 194,704, to Means, water is removed from the well bore to prevent paraffin from forming in the well.

These techniques do not prevent the accumulation of paraffin deposits but are designed to remove the paraffin after it has accumulated. Accordingly, a need exists for a process and apparatus which can prevent the accumulation of paraffin deposits in downhole equipment.

SUMMARY OF THE INVENTION

The present invention provides an apparatus and process for preventing the accumulation of paraffins. The apparatus comprises a pipe segment having a closed end and a closed outlet end. A metal tube having an inner surface and an outer surface comprising at least seventy-five percent nickel is substantially located in the pipe segment. The outlet end of the tube extends through the closed, outlet end of the pipe segment. Fluid is conveyed through a port located in the wall of the pipe segment and into contact with the outer surface of the tube. The fluid is conveyed into the inlet end of the tube, into contact with the inner surface of the tube, and through the outlet end of the tube.

BRIEF DESCRIPTION OF THE DRAWINGS

For a further understanding of the nature and objects of the present invention, reference is made to the following drawing in which like parts are given like reference numerals and wherein.

DESCRIPTION OF THE PREFERRED EMBODIMENTS

Figure 1:
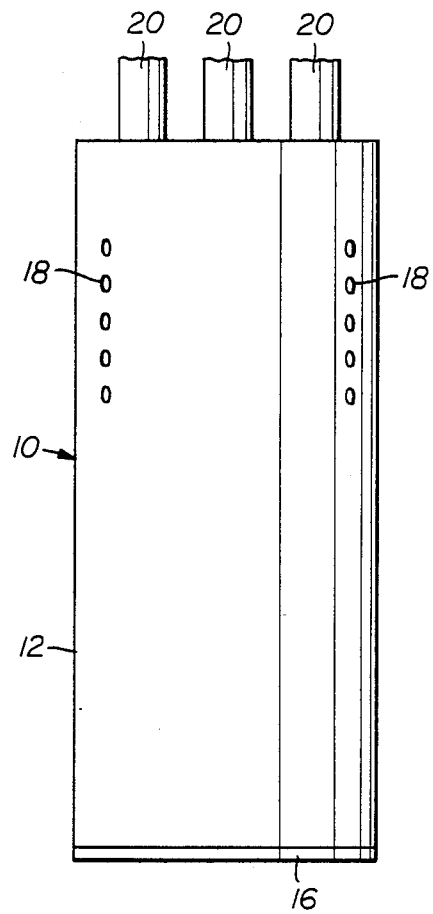
FIG. 1 illustrates an elevation view of a preferred embodiment of the present invention.

FIG. 1 illustrates one embodiment of the present invention. Crude oil and other hydrocarbons are produced from the underlying geological reservoir and are pumped through the production casing by a submerged pump (not shown). Device 10, shown as gas anchor 10, is located below the pump in the production tubing. Anchor 10 is generally comprised of conduit or pipe segment 12, which has a threaded female end 14 for engagement with the pump and is typically located in a substantially vertical orientation. At the lower end of pipe segment 12, end cap 16 is welded or otherwise attached to close the lower end of pipe segment 12. Ports 18 are bored or otherwise formed in pipe segment 12. Preferably, ports 18 are located in the upper end of pipe segment 12. In one embodiment of the invention, three vertical columns of ports 18 can be bored through segment 12, with each column of ports 18 being located at an equal, radial distance from the other columns of ports. As shown, each column of bores 18 are aligned in a substantially vertical column. If three columns of ports 18 are bored along the circumference of pipe segment 12, the radial distance between each column will be 120 degrees. In one embodiment of the invention, each port can be 3/16" in diameter.

Figure 2:
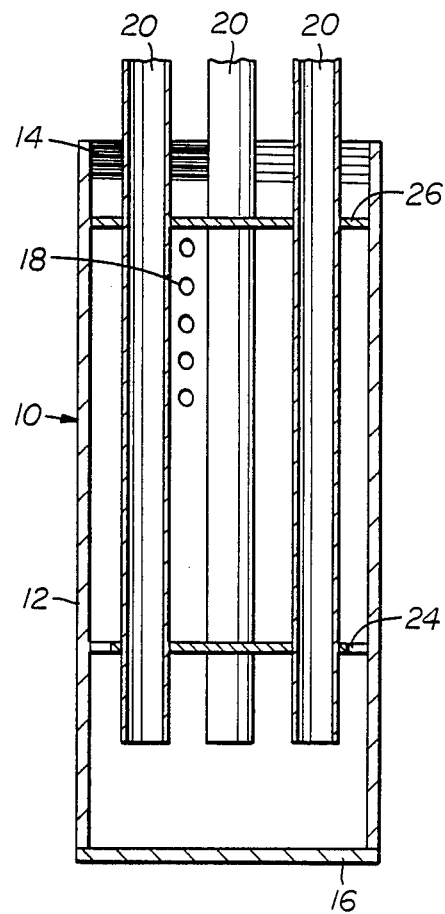
FIG. 2 illustrates a sectional view of the present invention.
Figure 3:
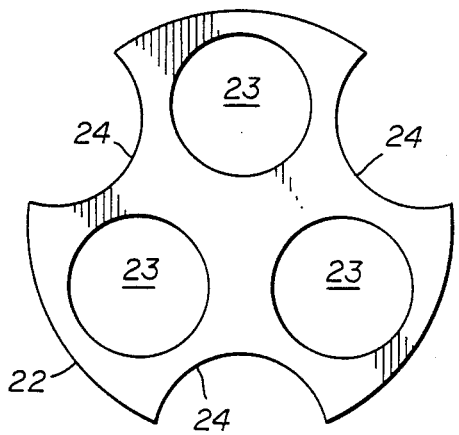
FIG. 3 illustrates a lower bushing connected between the tube and the pipe segment.
Figure 4:
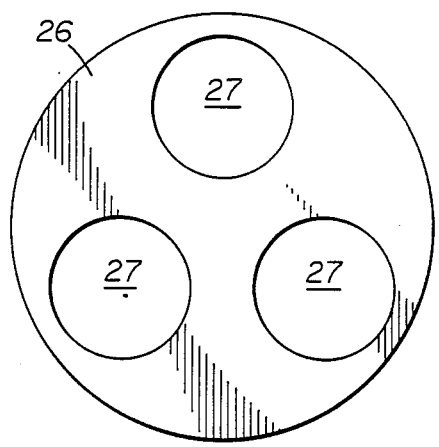
FIG. 4 illustrates one configuration of an upper bushing connected between the tube and the pipe segment.

Referring to FIG. 2, a sectional view of conduit segment 12 is illustrated. At least one tube 20 is located within segment 12. As illustrated, three tubes 20 are located within segment 12, and each tube 20 is generally shaped as a cylinder having both ends open. The purpose of the open ends is described below. At the lower, inlet end of tubes 20, lower bushing 22 retains tubes 20 in a fixed position relative to pipe segment 12. Referring to FIG. 3, lower bushing 22 can be welded or otherwise attached by conventional methods to pipe segment 12. Openings 23 permit the insertion of tubes 20 therethrough. The exterior surface of lower bushing 22 is generally circular, except that indentations, openings, or cutouts 24 are cut or otherwise formed into the perimeter of bushing 22. Referring to FIG. 4, upper bushing 26 is located at the upper, outlet end of tubes 20 to retain tubes 20 within segment 12. Upper bushing 26 closes the space between the outer surface of tubes 20 and the interior surface of pipe segment 12 to prevent fluid from leaking through the upper end of pipe segment 12. Openings 27 permit the insertion of tubes 20 therethrough during installation.

Tubes 20 are preferably formed in a metal which has a high nickel content. Substantially one hundred percent nickel is preferred, although concentrations as low as seventy-five percent will also prevent accumulation of paraffin deposits. It is known that nickel concentrations of fifteen percent or less do not substantially prevent the accumulation of paraffin deposits. In one embodiment, each tube 20 is fabricated from a metal which has a nickel content greater than seventy-five percent.

To utilize the invention, the fluid (not shown) is drawn through the well pipe or casing and into ports 18. The fluid which may be a production fluid, then travels downward, into contact with the outer surface of tubes 20 and enters the lower end of tubes 20. The fluid then flows upward through tubes 20, in contact with the inner surfaces of tubes 20, and flows through the upper, outlet ends of tubes 20. From there, the fluid flows into the pump or other downhole equipment. As the production fluid flows within pipe segment 12, the fluid contacts the outer surface of tubes 20 and then contacts the inner surface of tubes 20 as the fluid is drawn through gas anchor 10. In this embodiment of the invention, maximum surface contact of tubes 20 with the production fluid is obtained since the production fluid contacts both the inner and outer surfaces of tubes 20.

The invention furnishes an improved process and apparatus for preventing paraffin solids from accumulating in a downhole device such as a gas anchor. The invention operates without the addition of caustic chemicals and without the need for using additional energy to heat the hydrocarbon fluids to prevent paraffin deposits. Furthermore, the invention operates without the need for mechanical devices to agitate or to remove paraffin deposits.

It is apparent that many other variations of the apparatus and process described herein may be made without departing from the scope of the present invention. Because many varying and different embodiments may be made within the scope of the inventive concept herein taught, including equivalent structures and materials hereafter thought of, and because many modifications may be made in the embodiments herein described in accordance with the descriptive requirements of the law, it is to be understood that the embodiments set forth herein are illustrative and should not limit the scope of the invention.

What is claimed is:

1. A process for preventing the accumulation of paraffin deposits from a fluid, comprising the steps of:
   conveying the fluid, through at least one port in a substantially vertical pipe segment having a closed lower end, and into contact with the outer surface of a tube comprising at least seventy-five percent nickel which is located within said pipe segment wherein the inner surface of said tube also comprises at least seventy-five percent nickel; and
   conveying the fluid into the lower, inlet end of said tube so that the fluid passes through said tube and contacts the inner surface of said tube.

2. An apparatus for preventing the accumulation of paraffin deposits from a fluid which contacts the apparatus, comprising:
   a pipe segment having a closed end and a closed outlet end;
   a tube having an inner surface and an outer surface containing at least seventy-five percent nickel, wherein an outer end of said tube extends through the outlet end of said pipe segment and wherein the inlet end of said tube is located within said pipe segment; and
   a port through said pipe segment for permitting the fluid to enter the interior of said pipe segment, to contact the outer surface of said tube, and to contact the inner surface of said tube by entering the inlet end of said tube.

3. An apparatus as recited in claim 2, further comprising a bushing for retaining said tube in a fixed position relative to said pipe segment.

4. An apparatus as recited in claim 3, wherein said bushing has openings to permit the flow of fluid therethrough.

5. An apparatus as recited in claim 2, wherein said pipe segment is substantially vertical.

6. An apparatus as recited in claim 5, further comprising at least three of said ports which are aligned in a substantially vertical column.

7. An apparatus as recited in claim 6, further comprising at least three columns of ports substantially located near the upper end of said pipe segment.

8. A gas anchor apparatus for preventing the accumulation of paraffin deposits from a fluid which contacts the apparatus, comprising:
   a pipe segment having a closed end and an open outlet end;
   a metal tube having an inner surface and an outer surface containing at least seventy-five percent nickel, wherein said tube includes an inlet end located within said pipe segment and further includes an outlet end;
   a bushing connected between said tube and the outlet end of said pipe segment for preventing the flow of fluid through the open, outlet end of said pipe segment; and
   a port through said pipe segment for permitting the fluid to enter the interior of said pipe segment, to contact the outer surface of said tube, to contact the inner surface of said tube by entering the inlet end of said tube, and to exit through the outlet end of said tube.

9. An apparatus as recited in claim 8, wherein said pipe segment is substantially vertical.

10. An apparatus as recited in claim 9, further comprising a lower bushing for retaining said tube in a fixed position relative to said pipe segment.

11. An apparatus as recited in claim 10, wherein said lower bushing has openings to permit the flow of fluid therethrough.

* * * * *